(12) United States Patent
Janek

(10) Patent No.: US 11,996,727 B2
(45) Date of Patent: May 28, 2024

(54) ONLINE MEASUREMENT OF ANODE POTENTIAL FOR THE MAXIMIZATION OF CHARGING POWER AT LOW TEMPERATURES

(71) Applicant: SAMSUNG SDI CO., LTD., Yongin-si (KR)

(72) Inventor: Alex Janek, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 328 days.

(21) Appl. No.: 17/368,158

(22) Filed: Jul. 6, 2021

(65) Prior Publication Data
US 2022/0014035 A1     Jan. 13, 2022

(30) Foreign Application Priority Data

Jul. 7, 2020    (EP) ..................................... 20184395
Jul. 6, 2021    (KR) ........................ 10-2021-0088613

(51) Int. Cl.
*H02J 7/00*       (2006.01)
*H01M 10/44*      (2006.01)
*H01M 10/48*      (2006.01)

(52) U.S. Cl.
CPC ....... *H02J 7/007182* (2020.01); *H01M 10/44* (2013.01); *H01M 10/48* (2013.01); *H02J 7/0013* (2013.01); *H01M 2220/20* (2013.01)

(58) Field of Classification Search
CPC .. H02J 7/007182; H02J 7/0013; H01M 10/44; H01M 10/48; H01M 2220/20
(Continued)

(56) References Cited

U.S. PATENT DOCUMENTS

2006/0132101 A1*   6/2006   Ambrosio ........... H01M 10/613
                                                              320/150
2009/0104510 A1    4/2009   Fulop et al.
(Continued)

FOREIGN PATENT DOCUMENTS

CN         101855773 A     10/2010
CN         110247101 A      9/2019
(Continued)

OTHER PUBLICATIONS

Extended European Search Report dated Dec. 7, 2020 For EP 20184395.0.
(Continued)

*Primary Examiner* — Nathaniel R Pelton
(74) *Attorney, Agent, or Firm* — Lee IP Law, P.C.

(57) ABSTRACT

A battery system includes a non-reference battery cell; a reference battery cell including a cathode, an anode, and a reference electrode; a potential measuring means configured to measure a reference potential of the anode relative to the reference electrode, of the reference battery cell, and to generate a signal corresponding to the reference potential; and a controlling means configured to receive the signal and to reduce, during a charging process of the battery system, a charging current applied to the battery system when the signal indicates that the reference potential is below a predetermined threshold voltage. The non-reference battery cell may be disposed at a first position in the battery system, and the reference battery cell may be disposed at a second position in the battery system, the second position being a position that has a lowest temperature, among the first and second positions, during the charging process.

17 Claims, 2 Drawing Sheets

(58) Field of Classification Search
USPC .......................................................... 320/162
See application file for complete search history.

(56) References Cited

U.S. PATENT DOCUMENTS

| | | | |
|---|---|---|---|
| 2013/0009604 A1 | 1/2013 | Bhardwaj et al. | |
| 2019/0280345 A1* | 9/2019 | Spigno | H01M 4/661 |
| 2020/0176736 A1* | 6/2020 | Taga | H01M 50/204 |
| 2021/0245622 A1* | 8/2021 | Wang | H02J 7/0013 |

FOREIGN PATENT DOCUMENTS

| | | |
|---|---|---|
| DE | 102012018126 A1 | 3/2014 |
| JP | 2012-049040 A | 3/2012 |
| WO | WO 2013/006415 A2 | 1/2013 |

OTHER PUBLICATIONS

Chinese Office action dated Feb. 19, 2024, including Search Report dated Dec. 21, 2023, for corresponding Chinese Patent Application No. 202110766114.7.

\* cited by examiner

ONLINE MEASUREMENT OF ANODE POTENTIAL FOR THE MAXIMIZATION OF CHARGING POWER AT LOW TEMPERATURES

CROSS-REFERENCE TO RELATED APPLICATION

European Patent Application No. 20184395.0, filed on Jul. 7, 2020, in the European Intellectual Property Office, and entitled: "Online Measurement of Anode Potential for the Maximization of Charging Power at Low Temperatures," and Korean Patent Application No. 10-2021-0088613, filed on Jul. 6, 2021, in the Korean Intellectual Property Office, are incorporated by reference herein in their entirety.

BACKGROUND

1. Field

Embodiments relate to online measurement of anode potential for the maximization of charging power at low temperatures.

2. Description of the Related Art

A rechargeable or secondary battery differs from a primary battery in that the rechargeable or secondary battery can be repeatedly charged and discharged, while the latter provides only an irreversible conversion of chemical to electrical energy. Low-capacity rechargeable batteries may be used as power supply for small electronic devices, such as cellular phones, notebook computers and camcorders, while high-capacity rechargeable batteries may be used as the power supply for hybrid vehicles and the like.

A rechargeable battery may include an electrode assembly including a positive electrode, a negative electrode, and a separator interposed between the positive and negative electrodes, a case receiving the electrode assembly, and an electrode terminal electrically connected to the electrode assembly. An electrolyte solution may be injected into the case in order to enable charging and discharging of the battery via an electrochemical reaction of the positive electrode, the negative electrode, and the electrolyte solution. The shape of the case may be, e. g. cylindrical or prismatic.

SUMMARY

Embodiments are directed to a battery system, including: a non-reference battery cell; a reference battery cell, the reference battery cell including a cathode, an anode, and a reference electrode; a potential measuring means configured to measure a reference potential, which is a potential of the anode relative to the reference electrode, of the reference battery cell, and to generate a signal corresponding to the reference potential; and a controlling means configured to receive the signal and to reduce, during a charging process of the battery system, a charging current applied to the battery system when the signal indicates that the reference potential is below a predetermined threshold voltage. The non-reference battery cell may be disposed at a first position in the battery system, and the reference battery cell may be disposed at a second position in the battery system, the second position being a position that has a lowest temperature, among the first and second positions, during the charging process.

Embodiments are directed to a battery pack including the battery system, a vehicle including the battery pack, and a vehicle including the battery system.

Embodiments are directed to a method for charging a battery system, the method including: measuring a reference potential of a reference battery cell, the reference potential being a potential of an anode of the reference battery cell relative to a reference electrode of the battery cell, the reference battery cell including the anode, a cathode, and a reference cathode that is the reference electrode; generating a signal corresponding to the reference potential; and reducing a charging current applied to the battery system during a charging process when the signal indicates that the reference potential is below a predetermined threshold voltage, the battery system including the reference battery cell and a non-reference battery cell, the non-reference battery cell being disposed at a first position in the battery system, and the reference battery cell being disposed at a second position in the battery system, the second position being a position that has a lowest temperature, among the first and second positions, during the charging process.

BRIEF DESCRIPTION OF THE DRAWINGS

Features will become apparent to those of skill in the art by describing in detail example embodiments with reference to the attached drawings in which.

DETAILED DESCRIPTION

Figure 1:
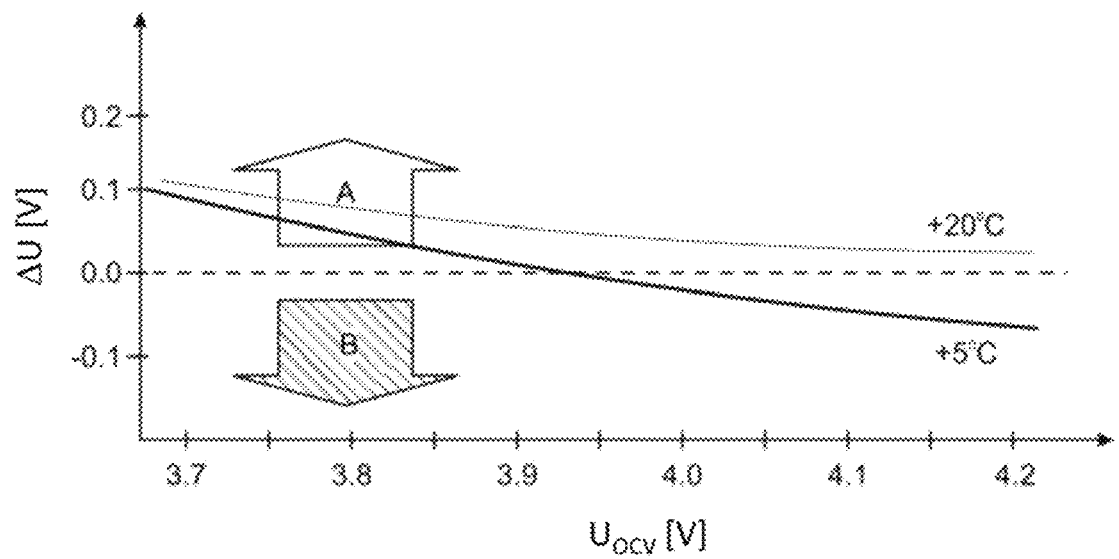
FIG. 1 is a diagram illustrating a battery cell's anode potential relative to a lithium reference electrode in dependence of a charging voltage applied to the battery cell.

As used herein, the term "and/or" includes any and all combinations of one or more of the associated listed items.

It will be understood that although the terms "first" and "second" may be used to describe various elements, these elements should not be limited by these terms. These terms are only used to distinguish one element from another element. For example, a first element may be named a second element and, similarly, a second element may be named a first element.

In the following description, the terms of a singular form may include plural forms unless the context clearly indicates otherwise.

It will be further understood that the terms "comprise," "include," "comprising," or "including" may specify a property, a region, a fixed number, a step, a process, an element, a component, and a combination thereof but do not exclude other properties, regions, fixed numbers, steps, processes, elements, components, and combinations thereof.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e. g., rotated 90 degrees or at other orientations) and the spatially relative descriptors used herein should be interpreted accordingly.

It will be understood that when an element, component, or layer is referred to as being "on," "connected to," or "coupled to" another element, component, or layer, it can be directly on, connected to, or coupled to the other element, component, or layer, or one or more intervening elements, components, or layers may be present. In addition, it will also be understood that when an element, component, or layer is referred to as being "between" two elements, components, or layers, it can be the only element, component, or layer between the two elements, components, or layers, or one or more intervening elements, components, or layers may also be present.

As used herein, the terms "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

The electronic or electric devices and/or any other relevant devices or components described herein may be implemented utilizing suitable hardware, firmware (e. g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions may be stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, the functionality of various computing devices may be combined or integrated into a single computing device, or the functionality of a particular computing device may be distributed across one or more other computing devices.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As described herein, a battery system may include a reference battery cell and a non-reference battery cell.

The reference battery cell may include a cathode, an anode, and a reference electrode. The reference battery cell may include a potential measuring means, which may be configured to measure a reference potential (the potential of the anode of the battery cell relative to the reference electrode of the battery cell). The potential measuring means may be further configured to generate a signal corresponding to the measured reference potential.

The battery system may include a controlling means configured to receive the signals of the potential measurement means, and configured to reduce, during a charging process of the battery system, a charging voltage applied to the battery system upon receiving, from the potential measurement means of at least one reference battery cell, a signal that indicates that the reference potential of the battery cell is below a predetermined threshold voltage. The predetermined threshold voltage may depend on a material used for the reference electrode.

Each of the reference battery cells and the non-reference battery cells may be disposed at a fixed position within the battery system. The reference battery cell may be disposed at a position that is expected to remain, during a charging process of the battery system, at a lower temperature in comparison to the temperature at the position at which the non-reference battery cell is disposed.

The terms "reference battery cell" and "non-reference battery cell" may respectively refer to two different types of battery cells, viz. a first type including a reference electrode (referred to as "reference battery cell") and a second type not including a reference electrode (referred to as "non-reference battery cell").

The battery cells in the battery system may be connected in series, in parallel, or a combination thereof.

The "potential measuring means" may be a voltmeter connected with the anode and the reference electrode of a reference battery cell. The "reference potential" denotes a potential difference between the anode potential and the potential of the reference electrode.

The controlling means may be integrated into a battery management unit (BMU) of the battery system. In another example embodiment, the controlling means may be integrated, e. g., in a vehicle's controlling system.

A battery system according to an example embodiment uses particular battery cells for measuring a reference potential of these cells placed in predefined particular positions (e.g., cold spots) in a target battery pack.

In general, lithium plating in a battery cell may result in the deposition ("plating") of lithium on the anode of a battery cell during the charging process. Such plating may make the 'plated' lithium unavailable for the charging of the cell.

A battery system according to an example embodiment be configured to limit a charging voltage and/or current in accordance with a determination of a lithium plating state of a battery cell in the battery pack. According to an example embodiment, a risk of lithium plating may be determined directly, e.g., by measuring the potential of the anode in comparison to that of a reference electrode, e. g., a lithium reference electrode.

Further, according to an example embodiment, cold spot cells in a battery pack may be identified and cells that allow for measurement of anode potential may be placed in the cold spots.

In an example embodiment of the battery system, a ratio of a number of reference battery cells relative to a total number of battery cells (i.e., the total number of reference battery cells+non-reference battery cells) may be less than 0.5 (i.e., 50%), e.g., less than 0.2 (i.e., 20%), e.g., less than 0.1 (i.e., 10%), e.g., less than 0.05 (i.e., 5%).

In an example embodiment of the battery system, the reference electrode may be a lithium electrode. In an example embodiment of the battery system, the predetermined threshold voltage may be 0 V (0 Volt).

In an example embodiment of the battery system, the charging voltage applied to the battery system may be determined using temperature dependency of at least one reference battery cell, e.g., in addition to using a dependence on reference potentials of the reference battery cells.

In an example embodiment of the battery system, the charging voltage applied to the battery system may be determined in dependence of a state of charge (SoC) of at least one reference battery cell, e.g., in addition to using the dependency on the reference potentials of the reference battery cells and/or the temperature of the reference battery cell. The state of charge (SoC) of a battery cell may be defined based on the potential between the anode and the cathode of that battery cell.

In an example embodiment of the battery system, at least one reference battery cell is disposed in a corner of the battery system. The "corner" of the battery system may be a position at a corner of a prismatic or cubic housing of the battery system.

In an example embodiment of the battery system, the battery system further includes a heating system configured to heat (i.e., to warm up) the battery cells included in the battery system.

In an example embodiment, the battery system further includes a heating system having a heating fluid channel. In an example embodiment of the battery system, a reference battery cell may be disposed in a location in the battery pack that has the least spatial distance (in comparison to the other battery cells) to the outlet of the heating fluid channel. In an example embodiment of the battery system, a battery cell having a maximum spatial distance, in comparison to the other battery cells, to the fluid channel may be a reference battery cell.

According to an example embodiment, a battery system may include a battery pack according to an example embodiment.

According to an example embodiment, a vehicle may include a battery system or a battery pack according to example embodiments.

According to an example embodiment, a method is provided for charging a battery system. The battery system may include at least one reference battery cell; at least one non-reference battery cell. The reference battery cells may each include a cathode, an anode, and a reference electrode. Each of the reference battery cells and the non-reference battery cells may be disposed at a fixed position within the battery system such that each of the positions at which a reference battery cell is disposed is expected to remain, during a charging process of the battery system, at a lower temperature in comparison to the temperature at any one of the positions at which a non-reference battery cell is disposed.

The method may include a) measuring, for each of the reference battery cells, a reference potential defined as the potential of the anode of the battery cell relative to the reference electrode of the battery cell by a potential measuring means; b) generating and transmitting, for each of the reference battery cells, a signal corresponding to the reference potential measured in step a) to a controlling means; c) receiving, by the controlling means, the signals corresponding to the reference potential of the reference battery cells generated in step b); and d) reducing, by the controlling means, the charging voltage applied to the battery system upon receiving, from the potential measurement means of at least one reference battery cell, a signal indicating that the reference potential of the battery cell is below a predetermined threshold voltage.

In an example embodiment of the method, the steps a) to d) may be executed while the battery system is being charged.

In an example embodiment of the method, a charging voltage applied to the battery system may be determined in dependence of a temperature of at least one of the reference battery cells.

In an example embodiment of the method, a charging voltage applied to the battery system may be determined in dependence of a state of charge (SoC) of at least one of the reference battery cells, e.g., in addition to the dependency on the reference potentials of the reference battery cells and/or the temperature of the reference battery cells.

In an example embodiment of the method, the reference electrode may be a lithium electrode.

In an example embodiment of the method, the predetermined threshold voltage may be 0 V (0 Volt).

In an example embodiment of the method, the method may further include e) increasing, by the controlling means, the charging voltage applied to the battery system upon receiving, from the potential measurement means of each of the reference battery cells, a signal indicating that the reference potential of the respective battery cell exceeds (i.e., is large than) the predetermined threshold voltage.

In an example embodiment of the method, the method may include f) adjusting, by the controlling means, the charging voltage applied to the battery system such that the signal corresponding to the reference potential of (at least) one of the reference battery cells indicates a reference potential being equal to the predetermined threshold voltage, and each of the signals corresponding to the reference potential of one of the remaining reference battery cells (if more than one reference battery cells are employed in the battery system) indicate a reference potential being equal to or larger than the predetermined threshold voltage. The operation f) may be a combination of operations d) and e), wherein operations d) and e) may be repeatedly executed.

Standard algorithms may be used to reduce the applied charging voltage according to operation d) and/or increase the applied charging voltage according to operation e) in response to the measured reference potential, such that the applied charging voltage converges to a value for which the reference potential becomes equal to the predetermined threshold voltage or approximately equal (i.e., up to a certain predefined deviation) to the predetermined threshold voltage.

The intense promotion of battery electric vehicles (BEVs) as full replacement of conventional vehicles may result in the extensive use of fast charging capabilities due to a relatively limited charge capacity of (currently available) lithium-ion batteries. Fast charging high charging power should thus be supported by battery systems and single battery cells. High energy density cells, which are mostly used in electric vehicles, may have high discharge power capabilities but the charging power (i.e., the maximum electric power with which those cells may be charged) may be more limited. Therefore, efficient use of limited charging power would support fast charging capabilities.

A limiting factor for efficient usage of cell charging capabilities is lithium plating. Lithium plating may cause the deposition ("plating") of lithium on the anode of a battery cell during the charging process (making the 'plated' lithium unavailable for the charging of the cell), which may reduce the available capacity of the cell and may lead to a risk of safety incidents as well.

The risk (i.e., the probability) of lithium plating occurring in a cell being charged may be measured if the cell is equipped with a reference electrode. In this case, only the anode potential relative to the potential of the reference electrode (in the following referred to as reference potential; see below) may be monitored: if the reference potential is lower than a certain predefined threshold value $U_{thresh}$, it may be determined that lithium plating occurs whereas, is the reference potential is larger than that threshold value, it may be determined that lithium plating does not occur.

The above may be further understood with respect to following and with reference to FIG. 1, which shows a diagram illustrating a battery cell's reference potential $\Delta U$ (measured in Volt) in dependence of an open circuit voltage $U_{OCV}$ (OCV, likewise measured in Volt) of the battery cell for different temperatures T of the cell (the temperatures T=+20° C. and T=+5° C. are chosen as example temperature values in FIG. 1).

In this context, the open circuit voltage $U_{OCV}$ refers to a representation of the charging state of the battery in a relaxed state (rest state), i.e., the open circuit voltage $U_{OCV}$ can be measured between the anode and the cathode of the battery cell, when the battery is in a relaxed state. Further, the reference potential $\Delta U$ is defined as the anode potential relative to a reference electrode, i.e., the reference potential is the potential difference between the electric potential of the anode of the cell and the electric potential of the reference electrode of the cell, i.e., the voltage between the anode and the reference electrode, which can simply be measured, e. g., by a voltmeter.

In the example of FIG. 1, the reference electrode is a lithium electrode, which may be the simplest choice for the reference electrode, and in this case, the threshold value (denoted in the diagram of FIG. 1 by the dashed line), with which the measured reference potential is to be compared, is 0 V (0 Volt).

In an example embodiment, it may be determined that lithium plating occurs (for the case of a lithium reference electrode), if the measured value of the reference potential $\Delta U$ is negative, whereas lithium plating does not occur if the measured value of the reference potential $\Delta U$ is positive. This is schematically illustrated by the two arrows sketched into FIG. 1: arrow A indicates the area, wherein lithium plating would not occur, i.e., the area of $\Delta U>0$ V, while arrow B indicates the area, where lithium plating would typically occur, i.e., the area of $\Delta U<0$ V.

It may be determined that lithium plating occurs more at colder temperatures. For example, referring to FIG. 1, the reference potential $\Delta U$ remains positive at a given charging current $I_{charge}$ for the entire range of the open circuit voltage $U_{OCV}$ shown in FIG. 1 (approximately the range from $U_{OCV}$=3.7 V to $U_{OCV}$=4.2 V) at a cell temperature T=+20° C. In this case, it may be determined that there is no risk of lithium plating over the whole range of the open circuit voltage $U_{OCV}$ shown in FIG. 1. At a lower cell temperature T=+5° C., however, the reference potential $\Delta U$ is positive only for open circuit voltages $U_{OCV}$ smaller than about 3.9 V, whereas for open circuit voltages $U_{OCV}$ larger than about 4.0 V, the reference potential $\Delta U$ becomes negative. Thus, it may be determined that lithium plating will occur in the shown example for the given charging current $I_{charge}$, when the cell has a temperature of about +5° C. and the open circuit voltage $U_{OCV}$ exceeds a value of about 4.0 V.

According to an example embodiment, the measured value for the reference potential $\Delta U$ of a preselected (predefined) subset of the cells employed in a battery system may be used by the battery management algorithms to control and limit the allowed charging current $I_{charge}$ applicable for fast charging of the battery system. The allowed maximum charging current $I_{charge}^{max}$ for the battery system may then be communicated to a charger employed for charging the battery system and/or a vehicle's controlling system.

According to an example embodiment, for a certain cell, the maximum allowed charging current may be set as the charging current for which, at a given cell temperature T, the reference potential remains positive.

The reference potential $\Delta U$ of a cell may depend on the charging current $I_{charge}$ applied to the cell, $U_{OCV}$, and the temperature T of the cell. This may be established as the formula $\Delta U = f(I_{charge}, T, U_{OCV})$.

In this case, the allowed maximum charging current $I_{max}^{(cell)}$ for that particular cell may then be determined by the following relation:

$$f(I_{max}^{(cell)}, T, U_{OCV}) = U_{thresh}$$

with $U_{thresh}$ being the predefined threshold potential.

Using the above, it may be decided whether or not lithium plating occurs in the cell by comparing it with the measured value for the reference potential $\Delta U$ (see above).

In case of a lithium reference electrode, the threshold potential vanishes, i.e., $U_{thresh}^{(lithium)} = 0$, and the above relation simplifies to:

$$f(I_{max}^{(cell)}, T, U_{OCV}) = 0$$

Thus, when a reference potential $\Delta U \neq U_{thresh}$ (or $\Delta U \neq 0$ in the case of a lithium reference electrode) is detected, control algorithms may then vary the charging current applied to the cell as long as $\Delta U = U_{thresh}$ (or $\Delta U = 0$ for a lithium reference electrode) is, at least approximately, fulfilled. To that end, a monotonic behavior of the reference potential $\Delta U$ with regard to the applied charging current $I_{charge}$ in the interesting range for $I_{charge}$ may be exploited.

Figure 3:
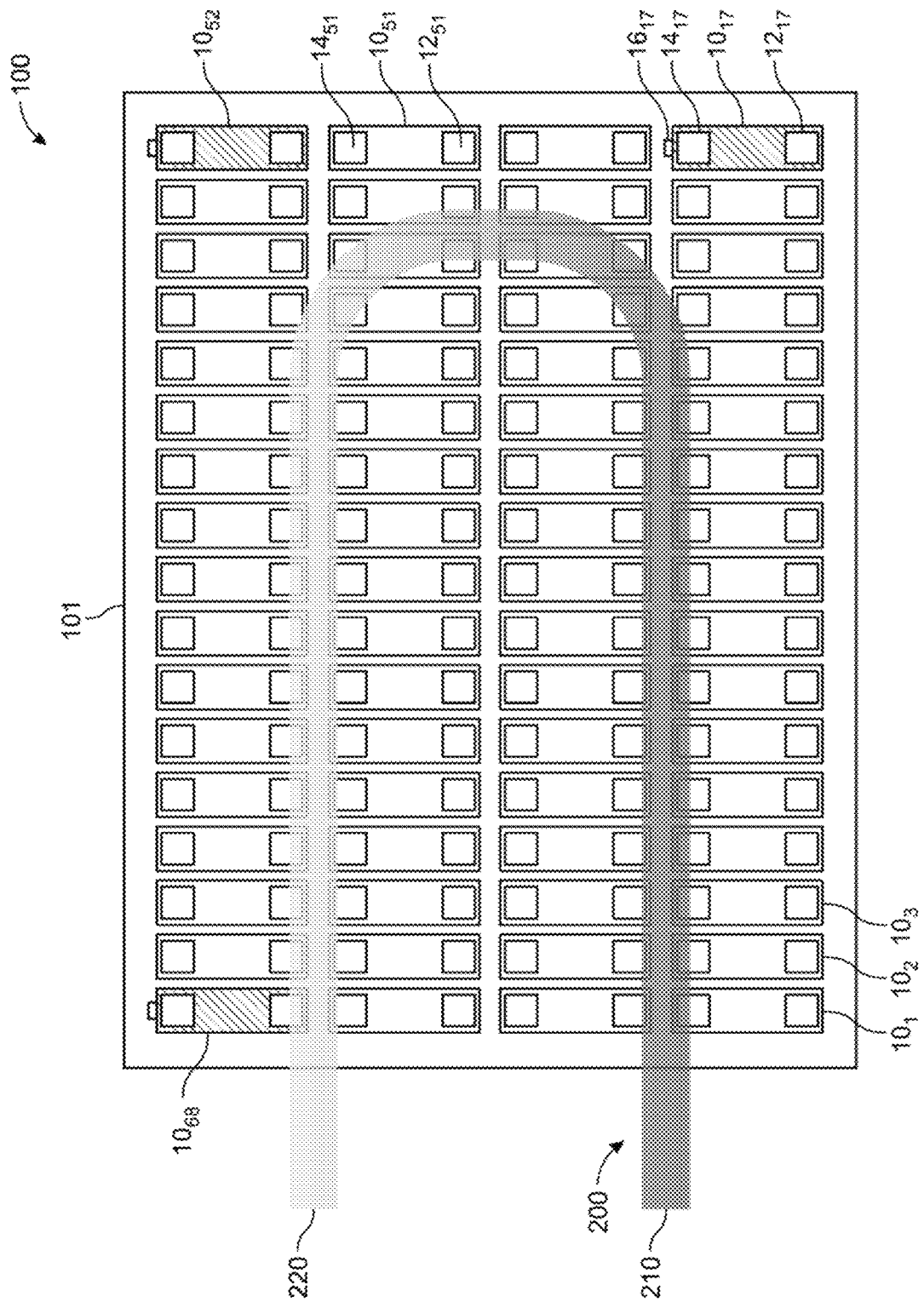
FIG. 3 illustrates schematically a sectional view through an example embodiment of a battery system, wherein a heating system is also indicated schematically.

The preselected cells of the battery system, for which a reference potential is measured (which may be referred to herein as "reference battery cells"), may be these cells, which (e.g., due to their spatial position within the battery system relative to the ambient atmosphere surrounding the battery system and/or relative to a heating system of the battery system) are expected to have the coldest temperature in comparison to the other cells during the charging process (this is described in additional detail below with reference to FIG. 3).

According to an example embodiment, several reference battery cells may be exposed to different temperatures, and the determined allowed maximum charging current may be different for these cells. For example, for a case in which the allowed maximum charging current has been determined for each of the reference battery cells, an allowed maximum charging current $I_{charge}^{max}$ for the battery system may then be determined based on the allowed maximum charging value for the single reference battery cells.

In a particular example, for a case in which the battery system includes M reference battery cells (in a battery system with N cells in total, and M<N) and the allowed maximum charging currents for these cells are denoted by $I_{charge}^{(1)}, I_{charge}^{(2)}, \ldots, I_{charge}^{(M)}$, respectively, the allowed maximum charging current $I_{charge}^{max}$ for the complete battery system may be determined to be $$I_{charge}^{max} = N \cdot \{I_{charge}^{(1)}, I_{charge}^{(2)}, \ldots, I_{charge}^{(M)}\},$$

if the cells are connected in parallel in the battery system, or the allowed maximum charging current $I_{charge}^{max}$ for the complete battery system may be determined to be $$I_{charge}^{max} = \min\{I_{charge}^{(1)}, I_{charge}^{(2)}, \ldots, I_{charge}^{(M)}\},$$

if the cells are connected in series in the battery system, and if the battery cells are configured to be charged with the same charging power.

Thus, it may be assured that the applied charging current does not exceed the respective allowed maximum charging current for any of the reference battery cells.

Other example embodiments may use other formulas to determine the allowed maximum charging current $I_{charge}^{max}$ for the complete battery system.

Figure 2:
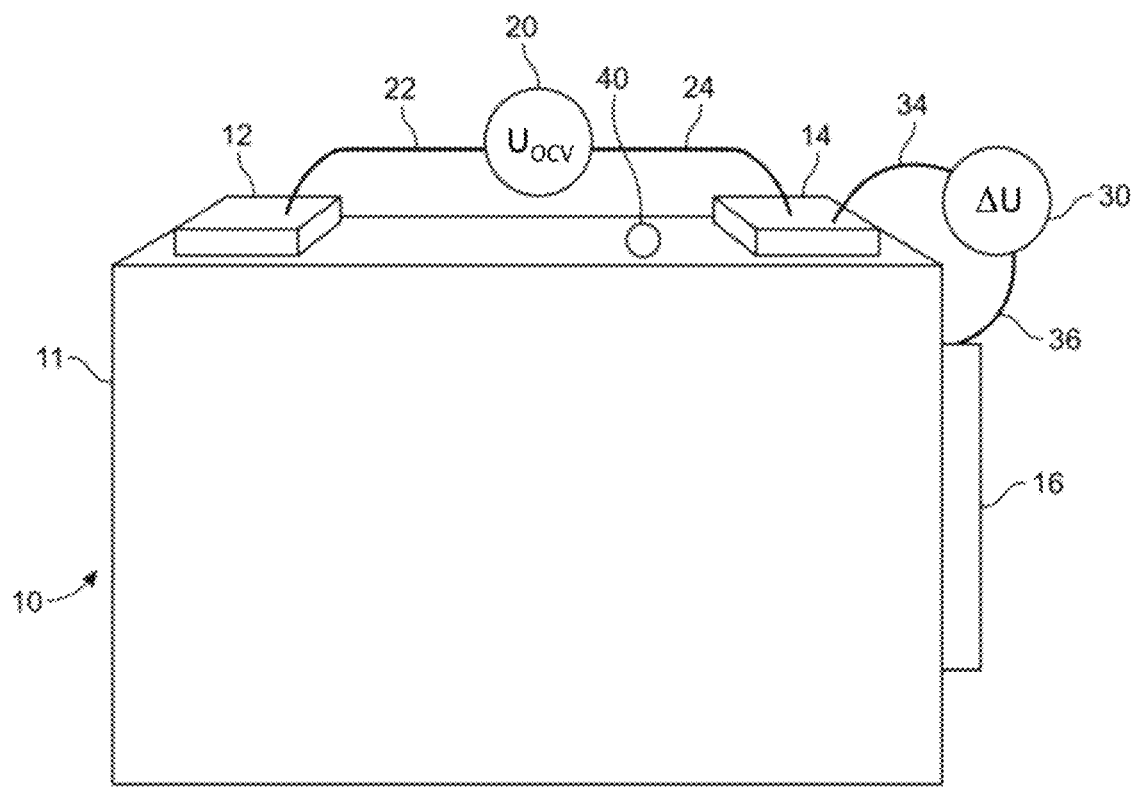
FIG. 2 is a schematic perspective view of a reference battery cell employed in an example embodiment.

FIG. 2 shows a schematic view of a battery cell 10 that may be employed as a reference battery cell 10 in an example embodiment.

Referring to FIG. 2, the reference battery cell 10 may include a housing 11 encasing electrochemically active components, such as an electrolyte, a separator, an anode, a cathode, and a reference cathode or reference electrode.

The anode (inside the housing 11; thus not visible in the figure) may be electrically connected with an anode connector 14 made of a conducting material, such that the anode inside the housing 11 and the anode connector are at a same electric potential. The anode and the anode connector 14 may be referred to as the "anode 14."

The cathode (inside the housing 11; not visible in the figure) may be electrically connected with a cathode connector 12 made of a conducting material, such that the cathode inside the housing 11 and the cathode connector 12 are at a same electric potential. The cathode and the cathode connector 12 may be referred to as the "cathode 12."

The reference electrode (inside the housing 11; not visible in the figure) may be electrically connected with a reference electrode connector 16 made of a conducting material, such that the reference cathode (reference electrode) inside the housing 11 and the reference electrode connector 16 are at a same electric potential. The reference electrode may be made of lithium. The connector 16 may be made of a different material from a material of the reference electrode inside the housing 11. The reference electrode and the reference electrode connector 16 may be referred to as "reference electrode 16."

In an example embodiment, the voltage provided by the cell 10 when in a use state (i.e., in a state not being charged), is the potential difference between the cathode 12 and the anode 14.

The potential difference between the cathode 12 and the anode 14 may be measured by a first potential measuring means 20 for measuring an electric potential (such as a voltmeter), which may be connected, via an electric connection 22 to the cell's cathode 12 and via a further electric connection 24 to the cell's anode 14.

Using the first potential measuring means 20, the state of charge (SoC) of the cell may be supervised. When being charged, the potential difference between the cathode 12 and the anode 14 corresponds to the charging voltage $U_{OCV}$.

If the measurement of the potential difference between the cathode 12 and the anode 14 is not to be performed, the connections 22 and 24 may not be present.

The potential difference between the anode 14 and the reference electrode 16 may be measured by a second potential measuring means 30 for measuring an electric potential (such as a voltmeter), which may be connected, via an electric connection 34, to the cell's anode 14 and via a further electric connection 36 to the cell's reference electrode 16.

The second potential measuring means 30 may be configured to measure the reference potential $\Delta U$ of the reference battery cell 10. The second potential measuring means 30 is further configured to generate and to send a signal corresponding to a control unit configured to evaluating this signal (see below).

In an example embodiment, the reference battery cell 10 may be equipped with a temperature sensor 40 for measuring the cell's temperature T, and configured to generate and send a corresponding temperature signal to a control unit configured to evaluate the temperature signal. In an example embodiment, a mixture of reference battery cells 10 may be used together, some having the temperature sensor 40 and some without.

FIG. 3 shows schematically a sectional view through a battery system according to an example embodiment. FIG. 3 illustrates an example embodiment of a battery system that includes a plurality of non-reference battery cells and a plurality of reference battery cells.

In an example embodiment, one or more single reference battery cells (i.e., cells being having the reference electrodes as described in the context of FIG. 2) are placed in particular positions in a battery pack, which may be based on a state-of-the-art battery module.

In an example embodiment, reference battery cells may be positioned in preselected cold spots within the battery system, which may be positions that are expected to have the lowest temperature during a charging process of the battery system.

In an example embodiment, one or more cold spots may be selected by considering the characteristics of a cooling/heating system integrated in the battery system and/or characteristics of the housing of the battery system, and reference battery cells may be disposed in each cold spot.

In an example embodiment, the respective reference potentials AU may be measured, e.g., only for reference battery cells in the cold spots.

Depending on the measured reference potentials AU, a maximum allowed fast charge current $I_{charge}^{max}$ for of the complete battery system may be determined by a battery management algorithm and communicated to a charger used for charging the battery system and/or to the vehicle's controlling system.

In an example embodiment, a measurement of a risk of lithium plating may be made with the battery system active or online, and in real-time, and management of the battery system may react accordingly by limiting charging current.

The reference battery cells 10 described with reference to FIG. 2 may be used in the battery system according to the example embodiment illustrated in FIG. 3.

Referring to FIG. 3, a battery system 100 may include plurality (e.g., 68) of battery cells $10_1$, $10_2$, $10_3$, ..., $10_{17}$, ..., $10_{51}$, $10_{52}$, ..., $10_{68}$, which may be disposed in a housing 101.

In the present example embodiment, three of the battery cells are reference battery cells 10, i.e., battery cells $10_{17}$, $10_{52}$, $10_{68}$ in FIG. 3, and these cells each have the reference electrode 16.

FIG. 3 exemplarily shows the reference battery cell $10_{17}$ positioned at the lower right corner of the battery system 100. As is the case for each of the reference battery cells $10_{17}$, $10_{52}$, $10_{68}$, the reference battery cell $10_{17}$ includes a cathode $12_{17}$, an anode $14_{17}$, and reference electrode $16_{17}$, which may be a reference electrode made of lithium.

Among the 68 battery cells in the present example embodiment, the 65 remaining cells are not reference battery cells, i.e., are non-reference battery cells, and may not include a reference electrode. This is exemplarily illustrated for battery cell $10_{51}$, which includes a cathode $12_{51}$ and an anode $14_{51}$, but no reference electrode.

In the example illustrated in FIG. 3, the selection of the positions for the reference battery cells $10_{17}$, $10_{52}$, $10_{68}$ has been made in consideration of which cell positions within the battery system 100 are expected to be the coldest positions during the charge of the battery system 100, i.e., which 3 battery cell positions are expected to remain at the lowest temperature in comparison to each of the other 65 cell positions.

Referring to FIG. 3, the battery system 100 may include a heating system.

The heating system may be arranged, e.g., below stacks of battery cells, as depicted FIG. 3.

The heating system may include a heating fluid channel 200. The heating fluid channel 200 may provide for a flow of heating fluid, e.g., as indicated in FIG. 3, by a U-shaped flow channel or flow path. The heating fluid channel 200 may be defined by, e.g., a pipe.

In an example embodiment, hot or warm heating fluid 210 may be provided by an (external) heating fluid supply (not shown) to enter the heating system, and may cool down while following the heating fluid channel 200 as the warmth of the heating fluid is transferred to the battery cells $10_1$, $10_2$, $10_3$, ..., $10_{17}$, ..., $10_{51}$, $10_{52}$, ..., $10_{68}$ of the battery system 100. Finally, a cooler fluid 220 may then exit the heating system and the battery system 100. A gradual and continuous dissipation of heat from the fluid while following the heating fluid channel 200 is indicated by the fading strength of the grayscale used to depict the heating fluid channel 200 in FIG. 3.

From the geometries of the housing 101 and the heating fluid channel 200, the coldest spots within the battery system 100 may be derived. For example, the positions of battery cells in the upper right corner and the lower right corner (with regard to FIG. 3) may be expected to remain at a lower temperature than positions of other battery cells, as the positions in the upper right corner and the lower right corner exhibit the maximum spatial distance to the heating fluid channel 200. Thus, the heat transfer to the battery cell $10_{52}$ in the upper right corner and to the battery cell $10_{17}$ in the lower right corner may be expected to be weak. Also, these battery cells are neighbored to the housing 101, such that they may be additionally cooled when the temperature of the ambient air and/or atmosphere of the battery system 100 is cold.

Further, as described above, the heat of the heating fluid decreases while flowing through the heating fluid channel 200. Thus, also the (warming) heat transfer to the battery cell having the least distance to the exiting (coolest) fluid 220 is expected to be weak. For example, referring to FIG. 3, the battery cell $10_{68}$ in the upper left corner may be least heated by the heating fluid channel 200.

Thus, it may be expected that the above-identified battery cells $10_{17}$, $10_{52}$, and $10_{68}$ are at positions that may be expected to remain colder than the other positions during a charge of the battery system 100. These battery cells $10_{17}$, $10_{52}$, $10_{68}$ may thus be selected to be implemented as reference battery cells, as described with reference to FIG. 2.

The reference potentials measured (or corresponding measurement signals) for the reference battery cells $10_{17}$, $10_{52}$, $10_{68}$ (which may be measured via the potential measurement means 30 as described above with reference to FIG. 2) may then be transmitted to a controlling means (not shown) configured to control the charging current and/or charging voltage applied to the complete battery system 100 as described above in the context of FIG. 1.

By way of summation and review, a battery pack may be implemented with a set of any number of (e.g., identical) battery systems or battery modules, which may be configured in a series, parallel, or a mixture of both to deliver the desired voltage, capacity, or power density. Components of battery packs may include the individual battery systems/modules, and interconnects that provide electrical conductivity therebetween.

Rechargeable batteries may be used in a battery system or a battery module formed of a plurality of unit battery cells coupled in series and/or in parallel so as to provide a high energy density, e.g., for motor driving of a hybrid or fully electric vehicle. Thus, the battery system may be formed by interconnecting the electrode terminals of the plurality of unit battery cells depending on an intended amount of power and in order to realize a high-power rechargeable battery.

For meeting the dynamic power demands of various electrical consumers connected to the battery system, a static control of battery power output and charging may be replaced by a steady exchange of information between the battery system and the controllers of the electrical consumers. This information may include, e.g., the battery systems actual state of charge (SoC), potential electrical performance, charging ability, internal resistance, and actual or predicted power demands or surpluses of the consumers.

Battery systems may include a battery management system (BMS) and/or battery management unit (BMU) for processing the aforementioned information. The BMS/BMU may communicate to the controllers of the various electrical consumers via a suitable communication bus, e.g., a SPI or CAN interface. The BMS/BMU may further communicate with each of the battery submodules, e.g., with a cell supervision circuit (CSC) of each battery submodule. The CSC may be further connected to a cell connection and sensing unit (CCU) of a battery submodule that interconnects the battery cells of the battery submodule. Thus, the BMS/BMU may be provided for managing the battery system or battery pack, such as by protecting the battery system/pack from operating outside its safe operating area, monitoring its state, calculating secondary data, reporting that data, controlling its environment, authenticating it and/or balancing it.

To provide thermal control of the battery system or battery pack, an active or passive thermal management system may be used for efficiently emitting, discharging and/or dissipating heat generated from its rechargeable batteries. If the heat emission/discharge/dissipation is not sufficiently performed, temperature deviations may occur between respective battery cells, such that the at least one battery system may not generate a desired amount of power. In addition, an increase of the internal temperature may lead to abnormal reactions occurring therein, and thus charging and discharging performance of the rechargeable battery may deteriorate and the life-span of the rechargeable battery is shortened. Thus, cooling for effectively emitting, discharging, or dissipating heat from the battery cells may be implemented. Conversely, heating may also be implemented, e.g., for a cold environment.

The implementation of fast charging may increase the importance of an efficient use of charging capabilities of battery cells. Battery cells employed in an EVB may be high energy density battery cells, which may support strong discharge power but may charge more slowly. For example, the application of charging power may be limited by the risk of lithium plating, the occurrence of which may significantly reduce life-time of the battery cell and could lead to a risk of safety-critical events.

The term 'lithium plating' relates to an electrochemical effect, which may occur during a charging process of a lithium-ion battery cell: metallic lithium forms inside the battery cell and becomes deposited on the anode of the battery cell. Then, deposited metallic lithium is no longer available for the charging process. As a result, the battery cell's life-time may be reduced. Also, metallic lithium may be flammable. Furthermore, lithium plating may lead to the formation of dendrites which, in the worst case, may penetrate the battery cell's separator and short-circuit the battery cell. Lithium plating may occur more readily at cold temperatures, e. g., at a temperature of 10° C. or lower of a battery cell being charged.

In order to avoid the occurrence of lithium plating during battery charging, aa large information table may be employed to define charging current limits (corresponding to charging voltage limits) depending on state of charge or voltage level and temperature of a battery. The supervision if these quantities is used to ensure, with the help of the charging current limits defined in the table, the operation of the battery cell in a range that does not cause lithium plating. However, a large testing effort may be needed to determine the values to be filled into the table. Further, as the anode potential of the battery cells may not be amenable to direct measurement, a relatively conservative charging limit may be used, which may impede an efficient use of the battery cell's charging capabilities. Determining a risk of lithium plating directly may thus provide for a more efficient usage of the battery cell's charging capabilities, e.g., by avoiding or loosening such conservative limits.

Moreover, different positions of battery cells in an arrangement of the battery cells within a battery system or battery pack, as well as the thermal connection of the battery cells to a cooling/heating system of the battery system or battery pack, may cause different temperature profiles for respective ones of the battery cells. Such temperature profiles, however, may not be readily measured. This may cause different risks of lithium plating for different battery cell positions.

In the recent years, vehicles for transportation of goods and peoples have been developed using electric power as a source for motion. Such an electric vehicle is an automobile that is propelled by an electric motor, using energy stored in rechargeable batteries. An electric vehicle may be solely powered by batteries or may be a form of hybrid vehicle additionally powered by for example a gasoline generator. Furthermore, the vehicle may include a combination of electric motor and conventional combustion engine. In general, an electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. Lithium-ion (and similar lithium polymer) batteries, widely known via their use in laptops and consumer electronics, dominate the most recent group of electric vehicles in development.

As described above, embodiments relate to a battery system that allows for an optimized charging process such that, e.g., the charging power is maximized when the battery system is in a low temperature environment. Embodiments also relate to a battery pack including one or more battery systems according to an embodiment, and to a vehicle including at least one battery system according to an embodiment and/or at least one battery pack according to an embodiment. Also, embodiments relate to a method for charging a battery system, wherein the charging power is maximized when the battery system is in a low temperature environment.

In an example embodiment, a battery system may be implemented without a table to define charging current limits in accordance with the environmental conditions, or implemented with a significantly reduced number of entries in the table, which may avoid or reduce testing efforts for the generation of the table. An example embodiment may allow for a direct measurement of an anode potential. An example embodiment may provide a battery system that takes into account different risks of lithium plating due to different positions of battery cells within the battery system.

REFERENCE SIGNS 10 reference battery cell
$10_1, \ldots, 10_{68}$ battery cells
$10_{17}, 10_{52}, 10_{68}$ reference battery cell
$10_{51}$ non-reference battery cell
11 housing of a battery cell
12 cathode of a battery cell
$12_1, \ldots, 12_{68}$ cathodes of respective battery cells
14 anode of a battery cell
$14_1, \ldots, 14_{68}$ anodes of respective battery cells
16, $16_{17}$ reference electrodes
20 means for measuring the potential difference between a battery cell's cathode and anode
22, 24 electric connections
30 means for measuring the potential difference between a reference battery cell's anode and reference electrode
34, 36 electric connections
40 temperature measurement means
100 battery system
101 housing of battery system
200 heating fluid channel
210 heating fluid entering into a heating fluid channel
220 heating fluid exiting from a heating fluid channel
ΔU reference potential
$U_{OCV}$ open circuit voltage (OCV)
$I_{charge}$ Charging Current Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
   a non-reference battery cell;
   a plurality of reference battery cells, each of the reference battery cells including a cathode, an anode, and a reference electrode;
   a potential measuring means configured to measure a reference potential, which is a potential of the anode relative to the reference electrode, of each of the reference battery cells, and to generate a signal corresponding to the reference potential; and
   a controlling means configured to receive the signal from each of the reference battery cells and to apply, during a charging process of the battery system, a charging current to the battery system, wherein each of the reference battery cells has an allowed maximum charging current based at least in part on the reference potential and a temperature of the reference battery cell, and wherein an allowed maximum charging current for the battery system is determined at least in part by the allowed maximum charging current for the reference battery cells respectively and a connection configuration of the reference battery cells.

2. The battery system as claimed in claim 1, wherein:
   the non-reference battery cell is provided in plural, and
   a ratio of a number of the non-reference battery cells relative to an overall number of battery cells in the battery system is greater than 2.

3. The battery system as claimed in claim 1, wherein the reference electrode is a lithium electrode.

4. The battery system as claimed in claim 1, wherein the controlling means is configured to adjust the charging current in dependence of the temperature of at least one of the reference battery cells.

5. The battery system as claimed in claim 1, wherein the controlling means is configured to adjust the charging current in dependence of a state of charge of at least one of the reference battery cells.

6. The battery system as claimed in claim 1, wherein one of the reference battery cells is disposed in a corner of the battery system.

7. The battery system as claimed in claim 1, further comprising a heating system having a heating fluid channel, the heating fluid channel having an outlet.

8. The battery system as claimed in claim 7, wherein one of the reference battery cells is disposed farther from the outlet than the non-reference battery cell.

9. The battery system as claimed in claim 7, wherein one of the reference battery cells is disposed farther from the heating fluid channel than the non-reference battery cell.

10. A battery pack comprising the battery system as claimed in claim 1.

11. A vehicle comprising the battery system as claimed in claim 1.

12. A vehicle comprising a battery pack as claimed in claim 10.

13. A method for charging a battery system including a non-reference battery cell and a plurality of reference battery cells, the method comprising:
    for each of the reference battery cells, measuring a reference potential of the reference battery cell, the reference potential being a potential of an anode of the reference battery cell relative to a reference electrode of the reference battery cell, the reference battery cell including the anode, a cathode, and a reference cathode that is the reference electrode;
    generating a signal corresponding to the reference potential; and
    applying a charging current to the battery system during a charging process, wherein each of the reference battery cells has an allowed maximum charging current based at least in part on the reference potential and a temperature of the reference battery cell, and wherein an allowed maximum charging current for the battery system is determined at least in part by the allowed maximum charging current for the reference battery cells respectively and a connection configuration of the reference battery cells.

14. The method as claimed in claim 13, wherein the charging current applied during the charging process is determined in dependence of the temperature of at least one of the reference battery cells.

15. The method as claimed in claim 13, wherein the charging current applied during the charging process is determined in dependence of a state of charge of at least one of the reference battery cells.

16. The method as claimed in claim 13, further comprising increasing the charging current applied during the charging process when the signal indicates that the reference potential exceeds a predetermined threshold voltage.

17. The method as claimed in claim 13, wherein:
    the plurality of reference battery cells includes a first reference battery cell and a second reference battery cell, and
    the method further comprises adjusting the charging current applied during the charging process when a first signal corresponding to the reference potential of the first reference battery cell indicates a reference potential of the first reference battery cell being equal to the predetermined threshold voltage and a second signal corresponding to the reference potential of the second reference battery cell indicates a reference potential of the second reference battery cell being larger than the predetermined threshold voltage.

* * * * *